(12) United States Patent
Khandelwal et al.

(10) Patent No.: US 10,642,914 B2
(45) Date of Patent: May 5, 2020

(54) AUTOMATICALLY GENERATING MULTI-IMAGE POSTS ON ONLINE SOCIAL NETWORKS

(71) Applicant: Facebook, Inc., Menlo Park, CA (US)

(72) Inventors: Shashikant Khandelwal, Mountain View, CA (US); Eric Gaudet, San Jose, CA (US); Hamza Aftab, San Francisco, CA (US); Risha Nagin Chheda, Mountain View, CA (US); Xintao Chen, Sunnyvale, CA (US); Mary Ann Haile, San Francisco, CA (US); Zoheb I. Hajiyani, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 345 days.

(21) Appl. No.: 15/660,731

(22) Filed: Jul. 26, 2017

(65) Prior Publication Data

US 2019/0034534 A1    Jan. 31, 2019

(51) Int. Cl.
| | | |
|---|---|---|
| *G06F 16/95* | (2019.01) | |
| *G06F 16/9535* | (2019.01) | |
| *G06K 9/46* | (2006.01) | |
| *G06K 9/62* | (2006.01) | |
| *H04L 12/58* | (2006.01) | |
| *G06F 16/583* | (2019.01) | |
| *G06K 9/00* | (2006.01) | |

(52) U.S. Cl.
CPC ........ *G06F 16/9535* (2019.01); *G06F 16/583* (2019.01); *G06K 9/00671* (2013.01); *G06K 9/00677* (2013.01); *G06K 9/4604* (2013.01); *G06K 9/6267* (2013.01); *H04L 51/32* (2013.01)

(58) Field of Classification Search
CPC .. G06F 16/9535; G06F 16/583; G06K 9/4604
See application file for complete search history.

(56) References Cited

U.S. PATENT DOCUMENTS

| | | | |
|---|---|---|---|
| 2014/0108206 A1* | 4/2014 | Chechuy | G06Q 30/0603 705/27.1 |
| 2014/0279068 A1* | 9/2014 | Systrom | G06Q 30/0277 705/14.73 |

* cited by examiner

*Primary Examiner* — Loc Tran
(74) *Attorney, Agent, or Firm* — Baker Botts L.L.P.

(57) ABSTRACT

In one embodiment, a method includes accessing, by a crawling module, a first structured document from an external server, where the first structured document is associated with a first post by a third-party content provider and includes multiple image objects and information associated with the image objects, extracting from the first structured document a sub-set of image objects and information associated with each of the image objects, analyzing the extracted image objects and information to identify categories of image objects based on their features, selecting a first category of image objects that has a highest number of image objects compared to a number of image objects in each other category of image objects, and generating a second post including a multi-image display that includes two or more of the image objects from the first category of image objects.

21 Claims, 7 Drawing Sheets

AUTOMATICALLY GENERATING MULTI-IMAGE POSTS ON ONLINE SOCIAL NETWORKS

TECHNICAL FIELD

This disclosure generally relates to online social networks and more particularly to generating posts with images within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the social-networking system 160 may automatically generate a multi-image post. A multi-image post may be a post comprising a multi-image display (e.g., a display with more than one image). In particular embodiments, the multi-image post generated may be associated with a third party (e.g., a third-party content provider). As an example and not by way of limitation, a third party may create a single-image post, and the social-networking system 160 may automatically generate a multi-image post based on information from the single-image post. As another example and not by way of limitation, the social-networking system 160 may provide a user interface to a third party that allows the third party to provide information or a link to a source of information from which a multi-image post may be generated. As yet another example and not by way of limitation, a third party may provide a URL to a web page hosted on an external server that may store images that may be used to generate a multi-image post. The social-networking system 160 may automatically generate the multi-image post by accessing the external server, analyzing the images and information from the external server to categorize the images, and selecting a category of images to use to generate the multi-image post. In particular embodiments, a multi-image post may tend to be more effective than a single-image post for advertisement posts. As an example and not by way of limitation, a multi-image advertisement post may tend to receive more views, have a higher click-through rate, have a higher conversion rate, or result in greater interaction with the post by users than a single-image post. In particular embodiments, a third party may be more likely to post a multi-image post that is automatically generated compared to manually composing a multi-image post. As an example and not by way of limitation, a problem with creating multi-image posts is that a third party may find it too time consuming to manually create a multi-image most or may not be aware that a multi-image post can be created unless the multi-image post is automatically generated. The embodiments described herein may help solve this problem by automatically generating a multi-image post without requiring extensive input by the third party. Particular embodiments may also decrease the amount of time a third party needs to create a multi-image post, thereby reducing the computing load of the social-networking system 160. Although this disclosure describes generating a multi-image post in a particular manner, this disclosure contemplates automatically generating a multi-image post in any suitable manner. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
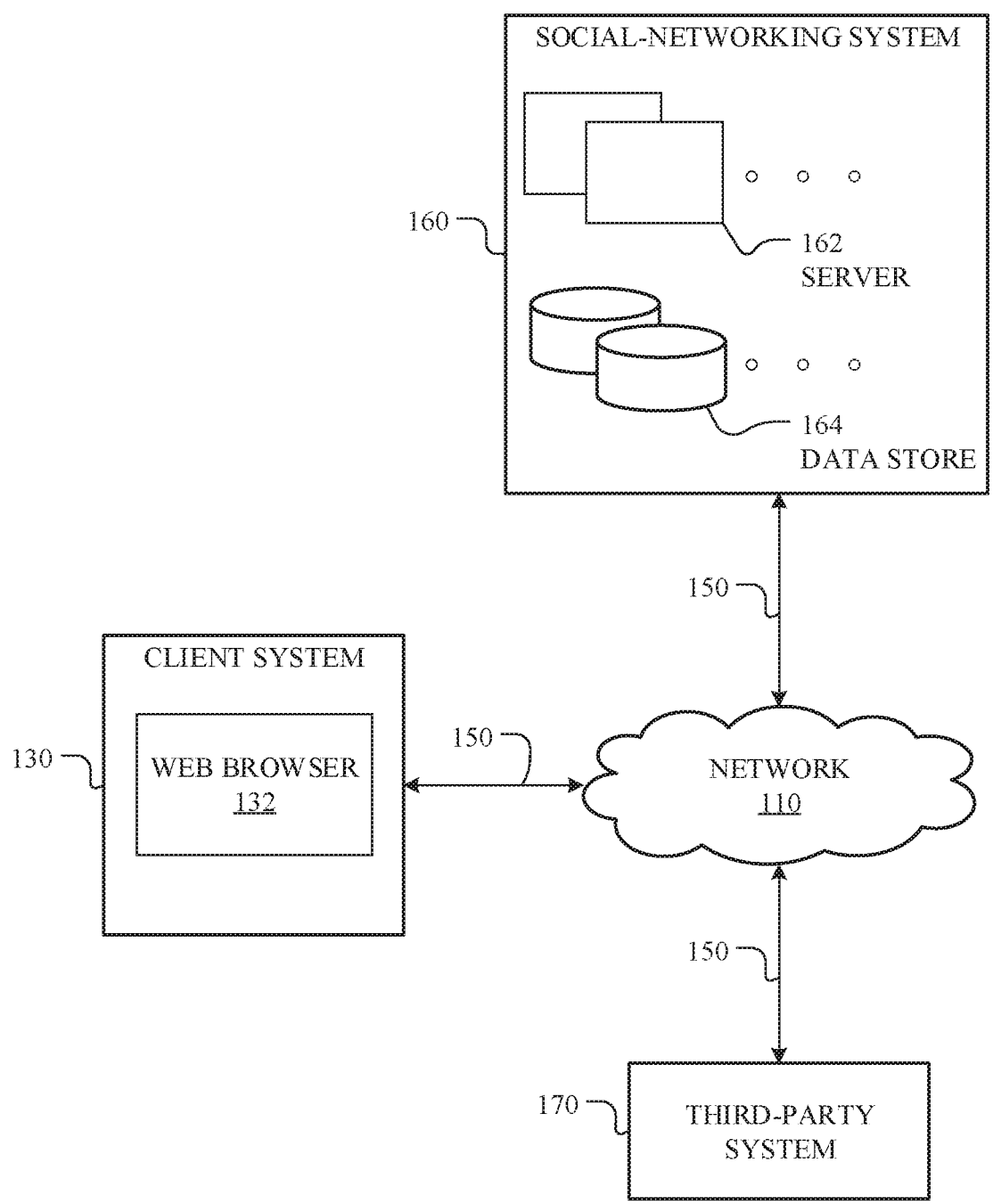
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Automatically Generating Multi-Image Posts on Social Networks

In particular embodiments, the social-networking system 160 may automatically generate a multi-image post. A multi-image post may be a post comprising a multi-image display (e.g., a display with more than one image). In particular embodiments, the multi-image post generated may be associated with a third party (e.g., a third-party content provider). As an example and not by way of limitation, a third party may create a single-image post, and the social-networking system 160 may automatically generate a multi-image post based on information from the single-image post. As another example and not by way of limitation, the social-networking system 160 may provide a user interface to a third party that allows the third party to provide information or a link to a source of information from which a multi-image post may be generated. As yet another example and not by way of limitation, a third party may provide a URL to a web page hosted on an external server that may store images that may be used to generate a multi-image post. The social-networking system 160 may automatically generate the multi-image post by accessing the external server, analyzing the images and information from the external server to categorize the images, and selecting a category of images to use to generate the multi-image post. In particular embodiments, a multi-image post may tend to be more effective than a single-image post for advertisement posts. As an example and not by way of limitation, a multi-image advertisement post may tend to receive more views, have a higher click-through rate, have a higher conversion rate, or result in greater interaction with the post by users than a single-image post. In particular embodiments, a third party may be more likely to post a multi-image post that is automatically generated compared to manually composing a multi-image post. As an example and not by way of limitation, a problem with creating multi-image posts is that a third party may find it too time consuming to manually create a multi-image most or may not be aware that a multi-image post can be created unless the multi-image post is automatically generated. The embodiments described herein may help solve this problem by automatically generating a multi-image post without requiring extensive input by the third party. Particular embodiments may also decrease the amount of time a third party needs to create a multi-image post, thereby reducing the computing load of the social-networking system 160. Although this disclosure describes generating a multi-image post in a particular manner, this disclosure contemplates automatically generating a multi-image post in any suitable manner. Additionally, although this disclosure describes or illustrates particular embodiments as providing particular advantages, particular embodiments may provide none, some, or all of these advantages.

In particular embodiments, the social-networking system 160 may access a first structured document from an external server. As an example and not by way of limitation, a third party may provide a link to the first structured document on the external server to the social-networking system 160. A structured document may be a document that comprises embedded coding that may give the document or portions of the document structural meaning according to a schema, such as text written in a markup language with semantically distinguishable annotations. As an example and not by way of limitation, a structured document may comprise text conforming to the syntax rules of the Extensible Markup Language (XML), the XML User Interface Language (XUL), the HyperText Markup Language (HTML), the Extensible HyperText Markup Language (XHTML), or any other suitable format. In particular embodiments, the first structured document may be associated with the third party. In particular embodiments, the first structured document may be associated with a first post on the online social network by a third-party content provider. As an example and not by way of limitation, the third-party content provider (e.g., a user, an account manager for a business page), may create a single-image post associated with the third-party content provider's business and a link to an external structured document (e.g., a webpage) on an external server. In particular embodiments, the first structured document may be a webpage associated with the third-party content provider. As an example and not by way of limitation, the first structured document may be a file written in HTML or another suitable markup language that coordinates web resources elements for the webpage (e.g., style sheets, scripts, images, etc.) to present the webpage. In particular embodiments, the first structured document may be an interface of a native application associated with the third-party content provider. As an example and not by way of limitation, a deep link, such as a uniform resource identifier (URI), may link to a location within a native application on a user's mobile device. The deep link may trigger the mobile device to run the native application and may further specify the location of the first structured document on the external server for presentation by the native application. The social-networking system 160 may access the first structured document by retrieving the first structured document from the location specified by the deep link. As another example and not by way of limitation, the URI "bigco://www.bigco.com/product/12467" may trigger a native application of third party provider Big Co. and specify that the native application will display information from the first structured document located by the URL "www.bigco.com/product/12467". The social-networking system 160 may access the first structured document (e.g., by using a crawling module) located by the URL "www.bigco.com/product/12467". In particular embodiments, the first structured document may include a plurality of image objects and information associated with each of the plurality of image objects. As an example and not by way of limitation, third party Widget Company may create a post that includes a single image of a widget and a link to Widget Company's webpage formatted in HTML and hosted on an external server. Widget Company's webpage may include images for several products and information about each of those products, such as the name, price, size, etc. In particular embodiments, the social-networking system 160 may access the first post, where the first post may include a single-image object, information associated with the single-image object, and a link to the first structured document. In particular embodiments, the crawling module may access the first structured document responsive to determining that the first post comprises a single-image object. As an example and not by way of limitation, a third party may use a post-composer interface to compose a post comprising a single-image object. The social-networking system 160 determine that the post being composed has a single-image object, and in response, may access the first structured document to automatically generate a multi-image post. Although this disclosure describes accessing a structured documents in a particular manner, this disclosure contemplates accessing a structured document in any suitable manner.

Figure 2:
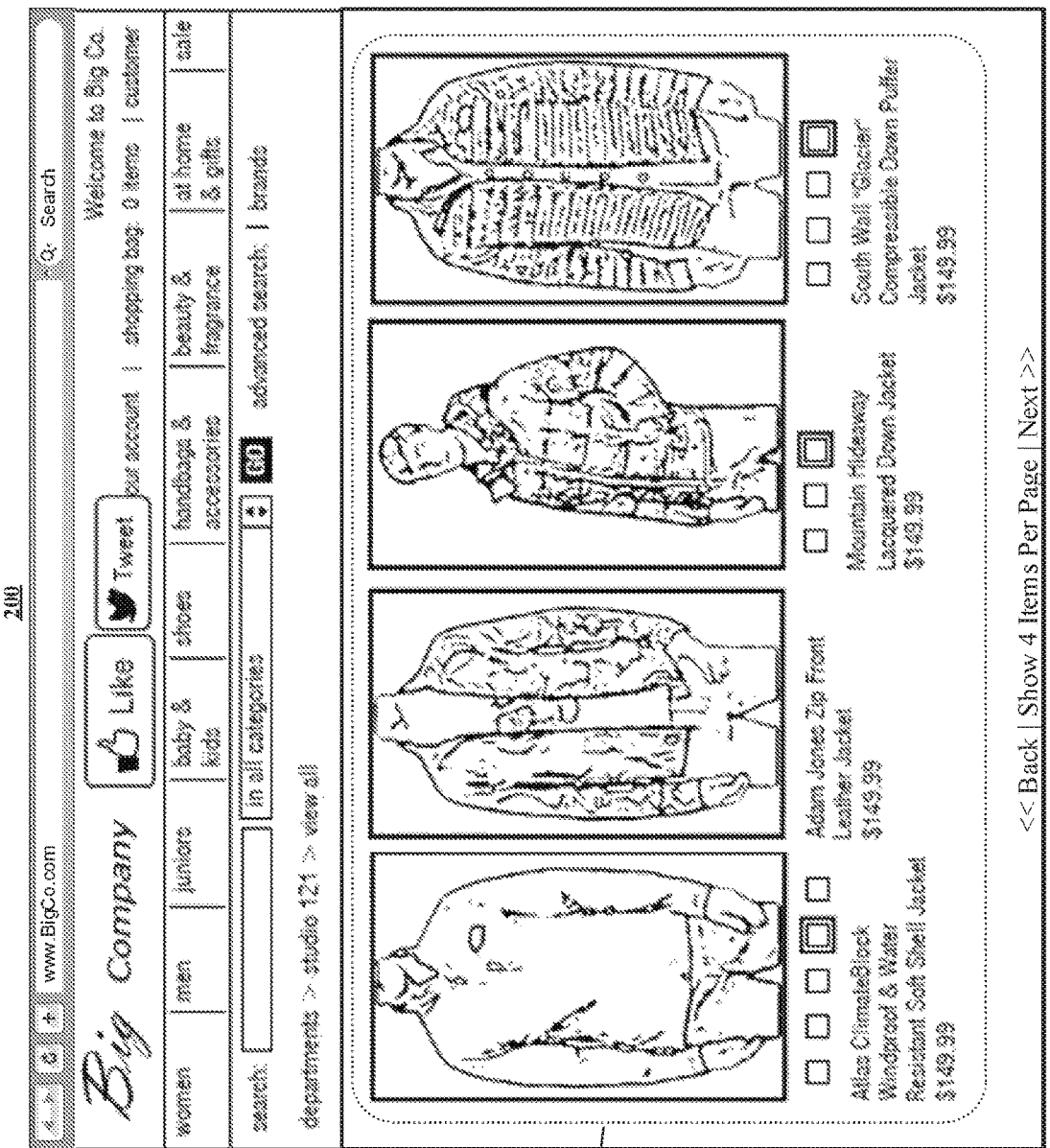
FIG. 2 an example structured document.

FIG. 2 illustrates an example structured document 200. The structured document 200 may be a website associated with third-party content provider Big Co., which may a department store. Structured document 200 may include images of products, and other information associated with each image As an example and not by way of limitation, portion 210 of structured document may include images of products and information associated with each product, such as the title "Adam Jones Zip Front Leather Jacket" and the price $149.99. Although this disclosure describes a particular structured document, this disclosure contemplates any suitable structured document.

In particular embodiments, the first structured document may be accessed by a crawling module. A crawling module may be a software module that accesses a first structured document and automatically identifies elements of the first structured document. The crawling module may automatically identify elements of the first structured document based on embedded coding of the first structured document. As an example and not by way of limitation, a crawling module may access a website of third party Widget Company, which may comprise a plurality of images. In particular embodiments, text of the first structured document may contain a reference to each image enclosed in a tag. As an example and not by way of limitation, a website may include the text "<image>bluewidget.jpg </image>", which may reference an image file named bluewidget.jpg corresponding to an image on the website. As another example and not by way of limitation, a website may contain the text "<image><name>Blue Widget </name><file>bluewidget.jpg </file></image>", which may be a reference to an image with the name "Blue Widget" located in a filed named "bluewidget.jpg". In particular embodiments, the crawling module may generate a hierarchical tree-based data structure containing the elements associated with the first structured document. The crawling module may access and automatically identify elements of a second structured document associated with the first structured document (e.g., if the first structured document contains a link to the second structured document). In particular embodiments, the social-networking system 160 may access the first structured document associated with a post of the social-networking system 160 in real-time, responsive to the post being posted on the social-networking system 160 by a third-party content provider. Additionally or alternatively, the social-networking system 160 may access the first structured document associated with a post by third-party content provider offline (e.g., a batch process). As an example and not by way of limitation, the social-networking system 160 may access the first structured document after a particular number of posts are posted. In particular embodiments, the social-networking system 160 may access the first structured document associated with the third-party content provider periodically. As an example and not by way of limitation, the social-networking system 160 may access the first structured documents associated with the posts on the social-networking system 160 every hour, every four hours or at any other suitable time interval. Although this disclosure describes accessing a structured document in a particular manner, this disclosure contemplates accessing a structured document in any suitable manner.

In particular embodiments, the social-networking system 160 may access a second structured document responsive to a tracking script on the first structured document being executed by the crawling module. A tracking script may be a script or embedded object that may track information associated with users who view content from a structured document. As an example and not by way of limitation, a tracking script may be a web beacon, a tracking pixel, or any other suitable tracking script. In particular embodiments, the second structured document may be an online product catalog associated with the third-party content provider comprising a plurality of product images and product information associated with each of the product images. In particular embodiments, the tracking script may be associated with one or more product identifiers (IDs). As an example and not by way of limitation, the social-networking system 160 may access, by a crawling module, a webpage page of a company, which may be the home page or landing page of the company's website. The landing page may comprise a first structured document and a tracking script. The social-networking system 160 may execute the tracking script, which may send information that identifies an online product catalogue comprising a second structured document and a product identifier for one or more products on the online product catalogue. In particular embodiments, the social-networking system 160 may extract, from the online product catalogue, the product images and product information associated with one or more of the product IDs associated with the tracking script. Although this disclosure describes accessing a second structured document in a particular manner, this disclosure contemplates accessing a second structured document in any suitable manner. Additionally, although this disclosure describes a particular second structured document, this disclosure contemplates any suitable second structured document.

In particular embodiments, the social-networking system 160 may extract, from the first structured document, a sub-set of image objects from the plurality of image objects and the respective information associated with each of the image objects in the sub-set of image objects. In particular embodiments, the extracted information associated with an image object may include the size of the image object, the dimension of the image object, aspect ratio of the image object, the position of the image object, a description of the image object, the price of the image object, a manufacturer's product number associated with an image object, a universal product number associated with the image object, or any other suitable information. As an example and not by way of limitation, a website of a furniture company may include a number of products offered by the furniture company. The website may include a structured document that includes images depicting furniture in the online product catalogue offered for sale. The structured document may also include information associated with each image. The information associated with an image may include information about the image file, such as the size, resolution, dimension, or file type of the image, and information about the item depicted by the image, such as the price, category (e.g., dining room furniture, bedroom furniture, outdoor furniture, etc.), type (e.g., chair, table, sofa, etc.), or Stock Keeping Unit number of the item depicted by the image, or any other suitable information associated with the image. The social-networking system 160 may extract from the structured document a sub-set of the images that include some or all of the images from the online product catalogue, as well as some or all of the information associated with each extracted image. Although this disclosure describes extracting a particular sub-set of images from a particular structured document in a particular manner, this disclosure contemplates extracting any suitable sub-set of images from any suitable structured document in any suitable manner.

In particular embodiments, the social-networking system 160 may extract a predefined number of image objects from the plurality of image objects. As an example and not by way of limitation, the social-networking system 160 may extract twenty image objects from a structured document comprising one hundred image objects. In particular embodiments, the social-networking system 160 may extract the sub-set of image objects and their information from the structured document online in real time and responsive to the structured document being accessed from the external server. Additionally or alternatively, the online social-networking system 160 may store the structured document and extract the sub-set of image objects and their respective information from the stored structured document. As an example and not by way of limitation, the social-networking system 160 may access a structured document and store the structured document in a data store when the network of social-networking system 160 during periods of relatively low bandwidth congestion, and wait for a period of relatively low CPU usage to extract the sub-set of image objects, which may be hours or days after storing the structured document. Although this disclosure describes extracting image objects and information from a structured document in a particular manner, this disclosure contemplates extracting image objects and information from a structured document in any suitable manner.

In particular embodiments, the social-networking system 160 may analyze the extracted image objects and information to identify one or more categories of image objects within the sub-set of image objects. The social-networking system 160, may use an image-categorization module to analyze the extracted image objects. In particular embodiments, each category of image objects may be identified based on one or more features of the image objects. As an example and not by way of limitation, features of an image object may be obtained by the image-categorization module based on information obtained from edge detection, corner detection, blob detection, ridge detection, scale-invariant feature transformation, edge direction, changing intensity, autocorrelation, thresholding, blob extraction, template matching, Hough transformations (e.g., lines, circles, ellipses, arbitrary shapes), or any other suitable information obtained from any suitable image analysis. As another example and not by way of limitation, features of an image object may include the size of the image object, the aspect ratio of the image object, the position of the image object, information associated with the image object (e.g., a text string, metadata, etc.), or any other suitable feature. In particular embodiments, a feature of an image object may be a text string in the structured document that is associated with the image object. As an example and not by way of limitation, a structured document may include the text "<image><file>product1.jpg</file><price>$5.99</price></image>", which may indicate that a feature of the image object stored by the file named "product1.jpg" is that the price of the product depicted in the image is $5.99. As another example and not by way of limitation, a text string associated with an image object may be a description of a product in the image object, a price of a product in the image object, a title of the image object, a manufacturer's product number of the product in the image object, a universal product number of the product in the image object, or any other suitable feature. In particular embodiments, the image-categorization module may comprise a model or function trained by machine learning that receives features of the image object and outputs a category. Although this disclosure describes analyzing an image object and identifying a category of an image object in a particular manner, this disclosure contemplates analyzing an image object or identifying a category of an image object in any suitable manner. Additionally, although this disclosure describes particular features of particular image objects, this disclosure contemplates any suitable feature of any suitable image object.

In connection with crawling structured documents and identifying a category of an image object, particular embodiments may utilize one or more systems, components, elements, functions, methods, operations, or steps disclosed in U.S. patent application Ser. No. 15/195,862, filed 28 Jun. 2016, which is incorporated by reference.

In particular embodiments, the social-networking system 160 may select, from among the one or more categories, a first category of image objects comprising a plurality of image objects within the sub-set of image objects. In particular embodiments, the first category of image objects may have a highest number of image objects compared to a number of image objects in each other category of the one or more categories of image objects. As an example and not by way of limitation, the social-networking system 160 may analyze extracted image objects from a webpage of a website of a furniture company and identify a chair category that includes ten images, a sofa category that includes four images, and a desk category that includes seven images. The social-networking system 160 may select the chair category as the first category, as the chair category has the highest number of images compared to the other categories. In particular embodiments, the largest collection of image objects with the same property pattern (e.g., same size, same aspect ratio, same position/alignment) may be selected as the featured category of image objects. In particular embodiments, the aspect ratio may be analyzed when two or more categories of image objects within the sub-set of image objects have a same number of objects compared to a number of image objects in each other category of the one or more categories of image objects. As an example not by way of limitation, when no suitable category is identified (e.g., when two or more categories of image objects have a same number of image objects), the aspect ratio of the image objects may be analyzed and a category of image objects with aspect ratio closest to that of square (i.e., a 1:1 aspect ratio) may be selected as the featured category of image objects. Although this disclosure describes selecting a category of image objects in a particular manner, this disclosure contemplates selecting a category of image objects in any suitable manner.

In particular embodiments the social-networking system 160 may generate a second post comprising a multi-image display. The multi-image display may be generated by a post-composer module. In particular embodiments, the multi-image display may include at least two or more of the image objects from the first category of image objects. In particular embodiments, the second post may include a link to the first structured document. In particular embodiments, the multi-image display may be a carousel display interface. A carousel display interface may display at least one image object, and may be operable to swipe through one or more additional image objects. In particular embodiments, a carousel display may display a magnified view of a central image object and its information may be displayed as the viewing user swipes the carousel of image objects, while other image objects may be displayed with original or reduced sizes. In particular embodiments, the multi-image display may be a grid-based interface. The grid-based interface may display a plurality of image objects in a grid-based orientation comprising at least one row and at least one column. As an example and not by way of limitation, a multi-image display may display twelve image objects in a grid-based interface comprising four rows and three columns. Each element of the grid may comprise one of the image objects of the first category of image objects, and may display information associated with the image object. In particular embodiments, the grid-based interface may be operable to scroll through a plurality of additional image objects from the first category of image objects, the additional images being displayed in a grid-based orientation. As an example and not by way of limitation, a first category of image objects may include 75 image objects. A grid-based interface may comprise five rows and five columns and each element may display one of the image objects of the first category of image objects. The grid-based interface may initially display 25 of the image objects in the first category. The grid-based interface may comprise an arrow icon, a button with the text "see more," or some other suitable user interface element that may allow a user to scroll through or otherwise display additional objects of the first category. In particular embodiments, social-networking system 160 may send a notification to the third-party content provider. The notification may be a link to an interface configured to display the second post. Although this disclosure describes generating a second post comprising a multi-image display in a particular manner, this disclosure contemplates generating a second post comprising a multi-image display in any suitable manner. Additionally, although this disclosure describes particular multi-image displays, this disclosure contemplates any suitable multi-image display.

In particular embodiments, the social-networking system 160 may automatically analyze the external structured document (e.g., by machine learning). In particular embodiments, the social-networking system 160 may classify all or a portion of an external structured document as a lead-generation type page or a non-lead-generation type page. The social-networking system 160 may extract information about input fields and content of a lead-generation type page. In particular embodiments, responsive to classifying all or a portion of the external structured document as a lead-generation type page, the social-networking system 160 may send a notification to the third-party content provider. The notification may be a link to an interface configured to create a native lead-generation post. As an example and not by way of limitation, the interface configured to create a native lead-generation post may be a tool for creating a native lead-generation type post, or may be a pre-generated native lead-generation type post created by the social-networking system 160 based on an analysis of the structured document. Additionally or alternatively, the notification may be a link to an interface configured to display the second post comprising a multi-image display, wherein the second post may be a lead-generation type post. Although this disclosure describes analyzing a structured document, classifying a structured document, and sending a notification in a particular manner, this disclosure contemplates analyzing a structured document, classifying a structured document, and sending a notification in any suitable manner. Moreover, although this disclosure describes a particular interface configured in a particular manner, this disclosure contemplates any suitable interface configured in any suitable manner. In connection with analyzing structured documents, classifying structured documents, extracting information, lead-generation pages, and lead-generation posts, particular embodiments may utilize one or more systems, components, elements, functions, methods, operations, or steps disclosed in U.S. patent application Ser. No. 15/596,368, filed 16 May 2017, which is incorporated by reference.

Figure 3A:
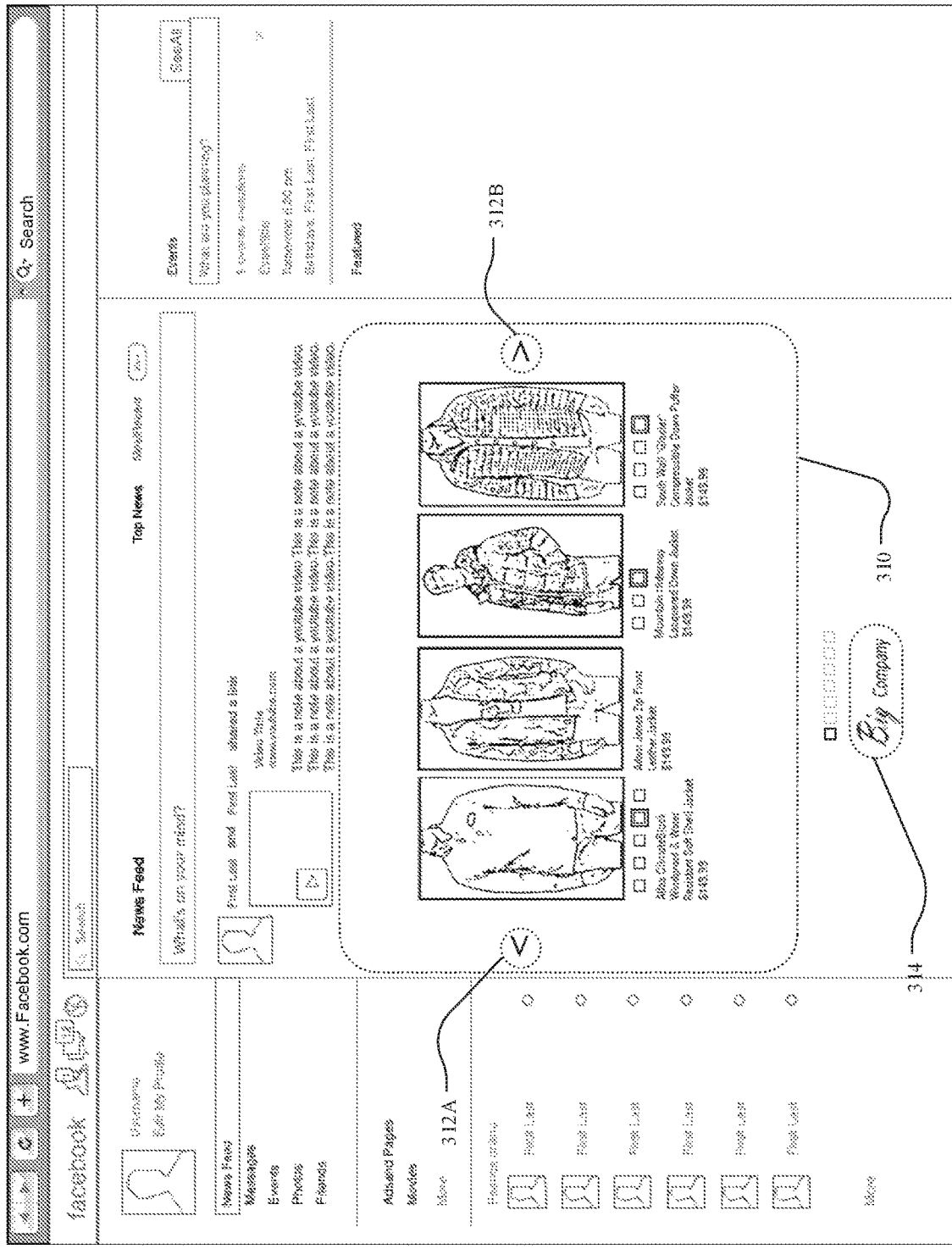
FIG. 3A illustrates an example carousel display interface.

FIG. 3A illustrates an example carousel display interface. The multi-image display in FIG. 3A may include a carousel display interface 310 and a logo 314 associated with the third-party content provider. The viewing user may swipe through the image objects by using the user interface elements illustrated as arrows 312A and 312B to view other image objects. As an example and not by way of limitation, a multi-image display associated with the Big Co. may include the images, title and a short description for each image object, the logo of the Big Co. and arrows to scroll through the image objects. Although this disclosure describes a particular multi-image display, this disclosure contemplates any suitable multi-image display.

Figure 3B:
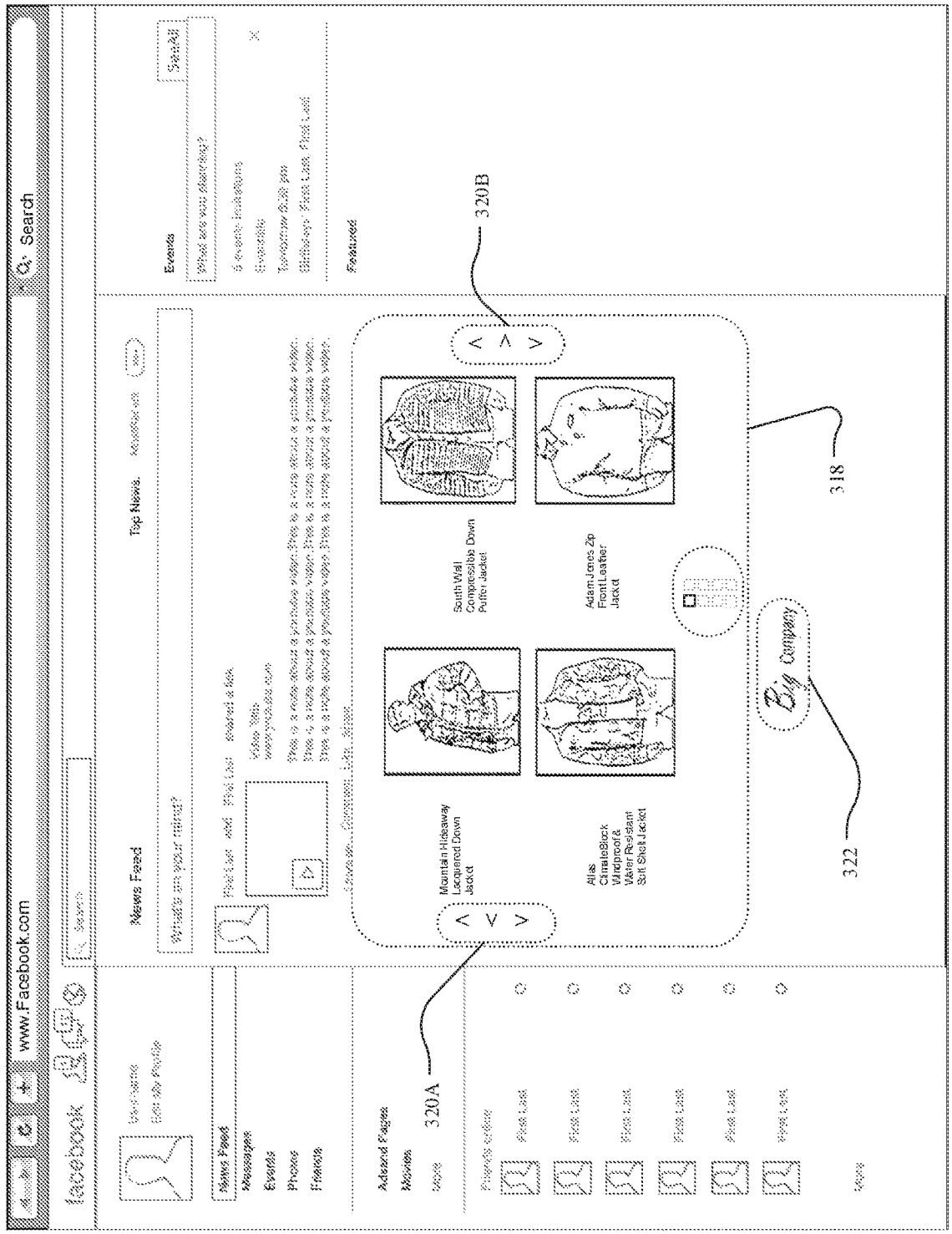
FIG. 3B illustrates an example grid-based interface.

FIG. 3B illustrates an example grid-based interface. The multi-image display illustrated in FIG. 3B may include a grid-based interface 318 and include a logo 322 associated with the third-party content provider. The viewing user may swipe through the image objects the user interface elements illustrated as arrows 320A and 320B to view other image objects. As an example and not by way of limitation, a multi-image display associated with the Big Co. may include the image object, titles and short description for each image object, the logo of the Big Co. and arrows to scroll through the image objects horizontally or vertically. Although this disclosure describes a particular multi-image display, this disclosure contemplates any suitable multi-image display.

In particular embodiments, the social-networking system 160 may send a post-composer interface to a client device of the third-party content provider. The social-networking system 160 may use a post-composer module to send the post-composer interface. The post-composer interface may be operable to compose the first post. As an example and not by way of limitation, a post-composer interface may display user interface elements that allow a user to input post contents, such as images, text, links, or other content of a post. In particular embodiments, the social-networking system 160 may receive, from the client device, post content for the first post inputted via the post-composer interface, where the post content may include a link to the first structured document. As an example and not by way of limitation, a third-party content provider may provide, via the post-composer interface, a URL to a webpage and an image for a post. In particular embodiments, the crawling module may access the first structured document responsive to receiving post content comprising the link to the first structured document. Although this disclosure describes a particular post-composer interface, this disclosure contemplates any suitable post-composer interface.

In particular embodiments, the social-networking system 160 may receive instructions from the third-party content provider to modify the second post. As an example and not by way of limitation, the third-party content provider may send instructions via a post-composer interface to add an additional image to the second post, remove an image from the second post, modify information associated with an image of the second post, change the category of the image objects of the second post, or to otherwise modify the second post in any suitable manner. The social-networking system 160 may post the modified second post on the online social network. Although this disclosure describes modifying a post in a particular manner, this disclosure contemplates modifying a post in any suitable manner.

Figure 4:
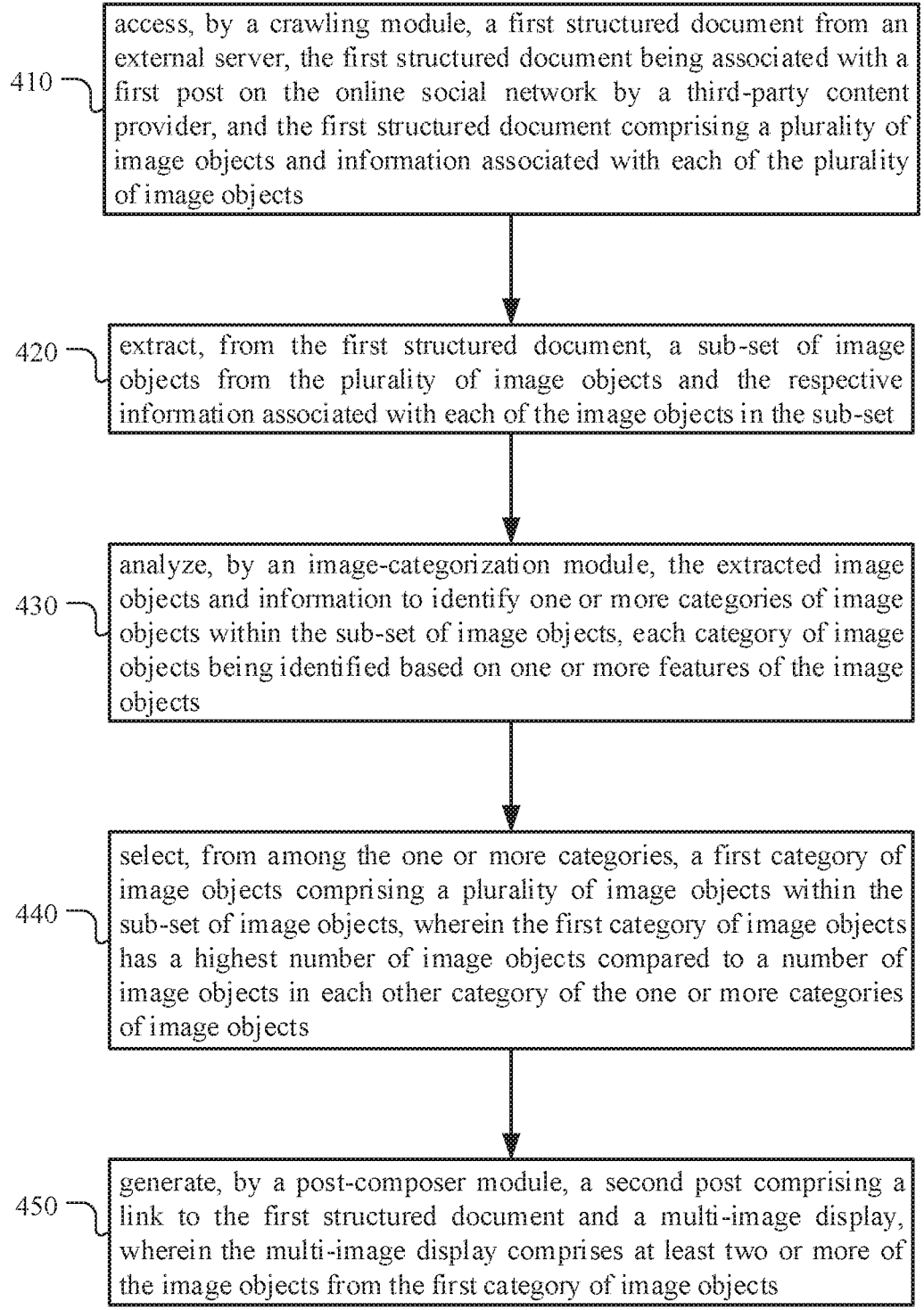
FIG. 4 illustrates an example method for automatically generating a multi-image post.

FIG. 4 illustrates an example method 400 for automatically generating multi-image posts. The method may begin at step 410, where the social-networking system 160 may access, by a crawling module, a first structured document from an external server, the first structured document being associated with a first post on the online social network by a third-party content provider, and the first structured document comprising a plurality of image objects and information associated with each of the plurality of image objects. At step 420, the social-networking system 160 may extract, from the first structured document, a sub-set of image objects from the plurality of image objects and the respective information associated with each of the image objects in the sub-set. At step 430, the social-networking system 160 may analyze, by an image-categorization module, the extracted image objects and information to identify one or more categories of image objects within the sub-set of image objects, each category of image objects being identified based on one or more features of the image objects. At step 440, the social-networking system 160 may select, from among the one or more categories, a first category of image objects comprising a plurality of image objects within the sub-set of image objects, wherein the first category of image objects has a highest number of image objects compared to a number of image objects in each other category of the one or more categories of image objects. At step 450, the social-networking system 160 may generate, by a post-composer module, a second post comprising a link to the first structured document and a multi-image display, wherein the multi-image display comprises at least two or more of the image objects from the first category of image objects. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for automatically generating multi-image posts on online social networks including the particular steps of the method of FIG. 4, this disclosure contemplates any suitable method for automatically generating multi-image posts on online social networks including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Social Graphs

Figure 5:
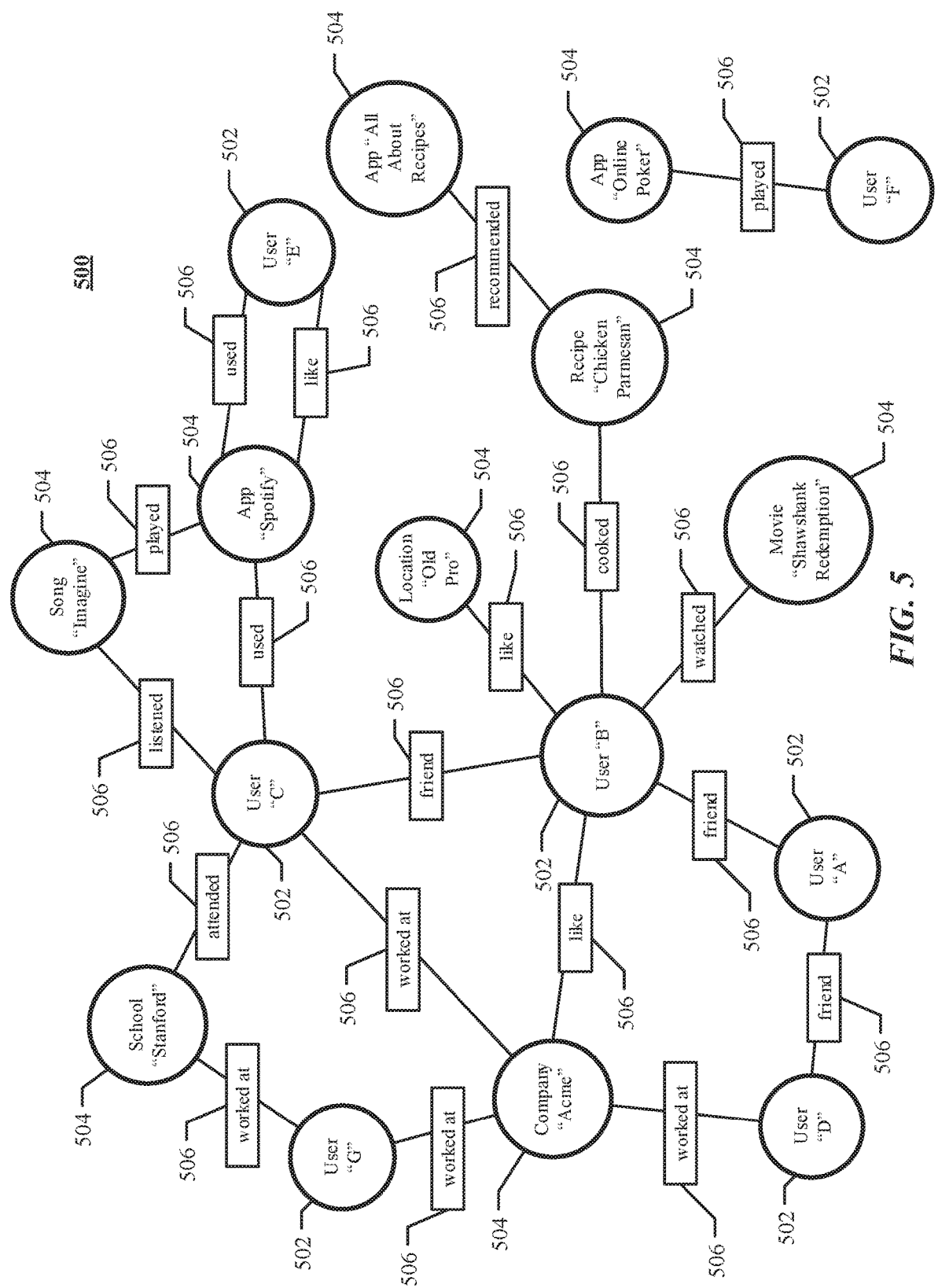
FIG. 5 illustrates an example social graph.

FIG. 5 illustrates an example social graph 500. In particular embodiments, the social-networking system 160 may store one or more social graphs 500 in one or more data stores. In particular embodiments, the social graph 500 may include multiple nodes—which may include multiple user nodes 502 or multiple concept nodes 504—and multiple edges 506 connecting the nodes. The example social graph 500 illustrated in FIG. 2 is shown, for didactic purposes, in a two-dimensional visual map representation. In particular embodiments, a social-networking system 160, a client system 130, or a third-party system 170 may access the social graph 500 and related social-graph information for suitable applications. The nodes and edges of the social graph 500 may be stored as data objects, for example, in a data store (such as a social-graph database). Such a data store may include one or more searchable or queryable indexes of nodes or edges of the social graph 500.

In particular embodiments, a user node 502 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with the social-networking system 160. In particular embodiments, a user node 502 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more web interfaces.

In particular embodiments, a concept node 504 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 504 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more web interfaces.

In particular embodiments, a node in the social graph 500 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 504. Profile interfaces may be viewable by all or a selected subset of other users. As an example and not by way of limitation, a user node 502 may have a corresponding user-profile interface in which the corresponding user may add content, make declarations, or otherwise express himself or herself. As another example and not by way of limitation, a concept node 504 may have a corresponding concept-profile interface in which one or more users may add content, make declarations, or express themselves, particularly in relation to the concept corresponding to concept node 504.

In particular embodiments, a concept node 504 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 502 corresponding to the user and a concept node 504 corresponding to the third-party web interface or resource and store edge 506 in one or more data stores.

In particular embodiments, a pair of nodes in the social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 506 connecting the first user's user node 502 to the second user's user node 502 in the social graph 500 and store edge 506 as social-graph information in one or more of data stores 164. In the example of FIG. 5, the social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or a subtype. A concept-profile interface corresponding to a concept node 504 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 506 and a "used" edge (as illustrated in FIG. 5) between user nodes 502 corresponding to the user and concept nodes 504 corresponding to the song and application to indicate that the user listened to the song and used the application. Moreover, the social-networking system 160 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, the social-networking system 160 may create an edge 506 between a user node 502 and a concept node 504 in the social graph 500. As an example and not by way of limitation, a user viewing a concept-profile interface (such as, for example, by using a web browser or a special-purpose application hosted by the user's client system 130) may indicate that he or she likes the concept represented by the concept node 504 by clicking or selecting a "Like" icon, which may cause the user's client system 130 to send to the social-networking system 160 a message indicating the user's liking of the concept associated with the concept-profile interface. In response to the message, the social-networking system 160 may create an edge 506 between user node 502 associated with the user and concept node 504, as illustrated by "like" edge 506 between the user and concept node 504. In particular embodiments, the social-networking system 160 may store an edge 506 in one or more data stores. In particular embodiments, an edge 506 may be automatically formed by the social-networking system 160 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Systems and Methods

Figure 6:
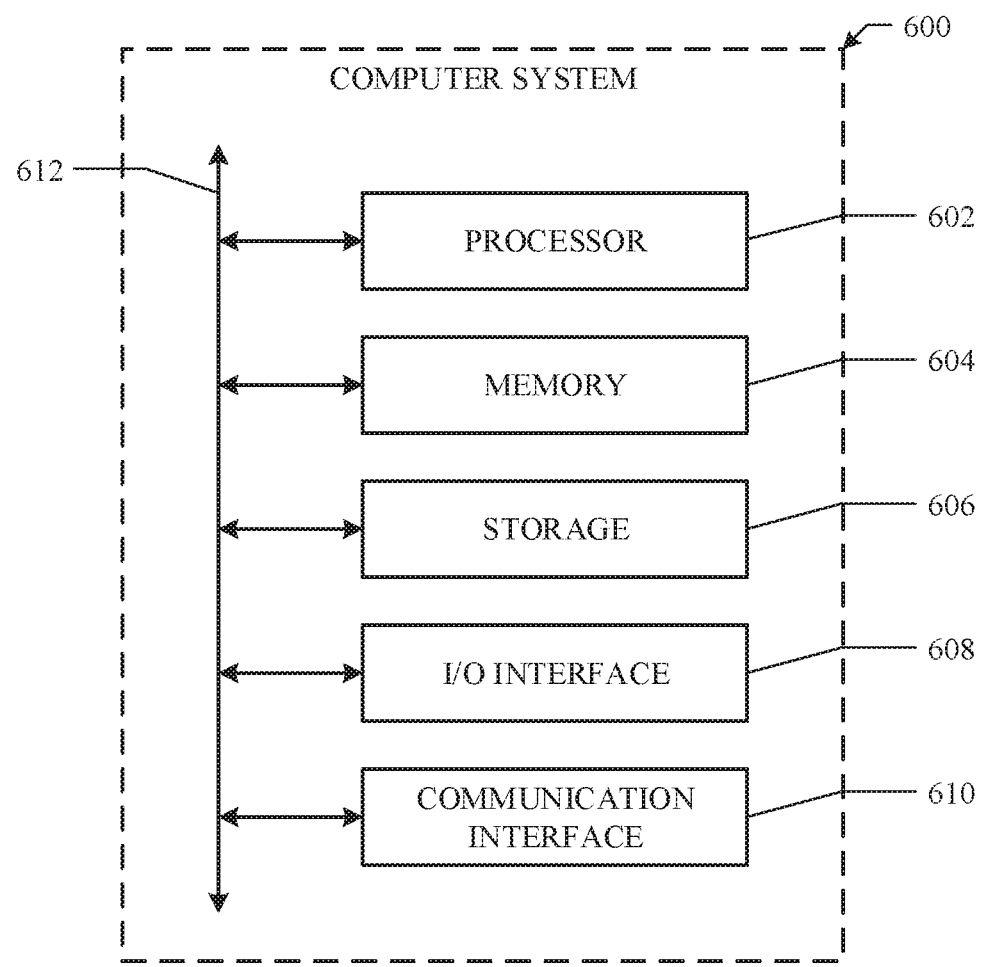
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of an online social network:
    accessing, by a crawling module, a first structured document from an external server, the first structured document being associated with a first post on the online social network by a third-party content provider, and the first structured document comprising a plurality of image objects and information associated with each of the plurality of image objects;
    extracting, from the first structured document, a sub-set of image objects from the plurality of image objects and the respective information associated with each of the image objects in the sub-set;
    analyzing, by an image-categorization module, the extracted image objects and information to identify one or more categories of image objects within the sub-set of image objects, each category of image objects being identified based on one or more features of the image objects;
    selecting, from among the one or more categories, a first category of image objects comprising a plurality of image objects within the sub-set of image objects, wherein the first category of image objects has a highest number of image objects compared to a number of image objects in each other category of the one or more categories of image objects; and
    generating, by a post-composer module, a second post comprising a link to the first structured document and a multi-image display, wherein the multi-image display comprises at least two or more of the image objects from the first category of image objects.

2. The method of claim 1, further comprising:
    accessing, by the crawling module, a second structured document responsive to a tracking script on the first structured document being executed by the crawling module, wherein the second structured document is an online product catalog associated with the third-party content provider comprising a plurality of product images and product information associated with each of the product images, and wherein the tracking script is associated with one or more product identifiers (IDs); and
    extracting, from the online product catalog, the product images and product information associated with one or more of the product IDs associated with the tracking script.

3. The method of claim 1, further comprising accessing the first post, wherein the first post comprises a single-image object, information associated with the single-image object, and a link to the first structured document, and wherein the crawling module accesses the first structured document responsive to determining that the first post comprises a single-image object.

4. The method of claim 1, further comprising:
    sending, by the post-composer module, a post-composer interface to a client device of the third-party content provider, wherein the post-composer interface is operable to compose the first post; and
    receiving, from the client device, post content for the first post inputted via the post-composer interface, wherein the post content comprises a link to the first structured document, and wherein the crawling module accesses the first structured document responsive to receiving the post content comprising the link to the first structured document.

5. The method of claim 1, wherein the first structured document is a webpage associated with the third-party content provider.

6. The method of claim 1, wherein the first structured document is an interface of a native application associated with the third-party content provider.

7. The method of claim 1, further comprising sending a notification to the third-party content provider, wherein the notification is a link to an interface configured to display the second post.

8. The method of claim 4, further comprising:
    receiving instructions from the third-party content provider to modify the second post; and
    posting the modified second post on the online social network.

9. The method of claim 1, wherein one of the features is a size of the image object in the structured document.

10. The method of claim 1, wherein one of the features is an aspect ratio of the image object in the structured document.

11. The method of claim 1, wherein one of the features is a positioning of the image object in the structured document.

12. The method of claim 1, wherein one of the features is a text string in the structured document that is associated with the image object.

13. The method of claim 12, wherein the text string describes one or more of:
- a description of a product in the image object;
- a price of a product in the image object;
- a title of the image object;
- a manufacturer's product number of a product in the image object; or
- a universal product number of a product in the image object.

14. The method of claim 1, wherein the sub-set of image objects comprises a predefined number of images.

15. The method of claim 1, wherein one of the features is an aspect ratio of the image object, wherein the aspect ratio is analyzed when two or more categories of image objects within the sub-set of image objects have a same number of objects compared to a number of image objects in each other category of the one or more categories of image objects.

16. The method of claim 1, wherein the multi-image display comprises a carousel display interface, wherein the carousel display interface displays at least one image object from the first category of image objects, and is operable to swipe through one or more additional image objects from the first category of image objects.

17. The method of claim 1, wherein the multi-image display comprises a grid-based interface, wherein the grid-based interface displays a plurality of image objects from the first category of image objects in a grid-based orientation comprising at least one row and at least one column.

18. The method of claim 17, wherein the grid-based interface is operable to scroll through a plurality of additional image objects from the first category of image objects, the additional images being displayed in a grid-based orientation.

19. One or more computer-readable non-transitory storage media embodying software that is operable when executed to:
- access, by a crawling module, a first structured document from an external server, the first structured document being associated with a first post on the online social network by a third-party content provider, and the first structured document comprising a plurality of image objects and information associated with each of the plurality of image objects;
- extract, from the first structured document, a sub-set of image objects from the plurality of image objects and the respective information associated with each of the image objects in the sub-set;
- analyze, by an image-categorization module, the extracted image objects and information to identify one or more categories of image objects within the sub-set of image objects, each category of image objects being identified based on one or more features of the image objects;
- select, from among the one or more categories, a first category of image objects comprising a plurality of image objects within the sub-set of image objects, wherein the first category of image objects has a highest number of image objects compared to a number of image objects in each other category of the one or more categories of image objects; and
- generate, by a post-composer module, a second post comprising a link to the first structured document and a multi-image display, wherein the multi-image display comprises at least two or more of the image objects from the first category of image objects.

20. A system comprising: one or more processors; and a non-transitory memory coupled to the processors comprising instructions executable by the processors, the processors operable when executing the instructions to:
- access a first structured document from an external server, the first structured document being associated with a first post on the online social network by a third-party content provider, and the first structured document comprising a plurality of image objects and information associated with each of the plurality of image objects;
- extract, from the first structured document, a sub-set of image objects from the plurality of image objects and the respective information associated with each of the image objects in the sub-set;
- analyze the extracted image objects and information to identify one or more categories of image objects within the sub-set of image objects, each category of image objects being identified based on one or more features of the image objects;
- select, from among the one or more categories, a first category of image objects comprising a plurality of image objects within the sub-set of image objects, wherein the first category of image objects has a highest number of image objects compared to a number of image objects in each other category of the one or more categories of image objects; and
- generate a second post comprising a link to the first structured document and a multi-image display, wherein the multi-image display comprises at least two or more of the image objects from the first category of image objects.

21. A system comprising:
- means for accessing a first structured document from an external server, the first structured document being associated with a first post on the online social network by a third-party content provider, and the first structured document comprising a plurality of image objects and information associated with each of the plurality of image objects;
- means for extracting, from the first structured document, a sub-set of image objects from the plurality of image objects and the respective information associated with each of the image objects in the sub-set;
- means for analyzing the extracted image objects and information to identify one or more categories of image objects within the sub-set of image objects, each category of image objects being identified based on one or more features of the image objects;
- means for selecting, from among the one or more categories, a first category of image objects comprising a plurality of image objects within the sub-set of image objects, wherein the first category of image objects has a highest number of image objects compared to a number of image objects in each other category of the one or more categories of image objects; and
- means for generating a second post comprising a link to the first structured document and a multi-image display, wherein the multi-image display comprises at least two or more of the image objects from the first category of image objects.

* * * * *